United States Patent [19]

Chang

[11] 4,214,009
[45] * Jul. 22, 1980

[54] REPLACEMENT OF EGG ALBUMEN IN FOOD COMPOSITIONS

[75] Inventor: Pei K. Chang, Montrose, N.Y.

[73] Assignee: Stauffer Chemical Company, Westport, Conn.

[*] Notice: The portion of the term of this patent subsequent to May 16, 1995, has been disclaimed.

[21] Appl. No.: 931,706

[22] Filed: Aug. 7, 1978

[51] Int. Cl.² .............................................. A23C 21/00
[52] U.S. Cl. .................... 426/558; 426/653; 426/614; 426/583
[58] Field of Search ............ 426/583, 41, 657, 614, 426/558, 549, 589, 653, 564, 570, 571, 101, 572

[56] References Cited

U.S. PATENT DOCUMENTS

| | | | |
|---|---|---|---|
| 3,475,180 | 10/1969 | Jones | 426/614 |
| 3,506,608 | 4/1974 | Perret | 426/614 |
| 3,870,801 | 3/1975 | Tombs | 426/92 |
| 3,911,144 | 10/1975 | Strong et al. | 426/614 |
| 3,935,323 | 1/1976 | Feminella et al. | 426/583 |
| 3,941,895 | 3/1976 | Ash et al. | 426/549 |
| 4,089,987 | 5/1978 | Chang | 426/583 |

Primary Examiner—S. Leon Bashore
Assistant Examiner—Michael Goldman
Attorney, Agent, or Firm—Paul J. Juettner

[57] ABSTRACT

Depending on the application, up to 100% of the egg albumen requirement of a food composition can be replaced with a composition comprising a whey protein concentrate and 0.5–15% carboxymethylcellulose. The composition of the present invention can also be used to extend whole eggs, replace milk up to 100% and combinations thereof. Substantially no change is seen in the food product containing the substitution. An economic advantage can be gained by the substitution.

20 Claims, No Drawings

REPLACEMENT OF EGG ALBUMEN IN FOOD COMPOSITIONS

DESCRIPTION OF THE PRESENT INVENTION

The present invention is related to a whey protein concentrate composition useful as a substitute for the egg albumen requirement in a food product.

BACKGROUND OF THE PRESENT INVENTION

Whey protein concentrates are well known materials in the prior art. These materials have been prepared by various means which effectuate the removal of the valuable whey protein from the millions of gallons of whey produced in this and other countries of the world per year. As more and more companies attempt to isolate this protein, more and more uses for the product have to be found. This is particularly important since the less expensive dry whey and delactosed whey can compete in various market areas that were originally held by whey protein concentrates.

The use of a whey protein concentrate as a replacement for non-fat dry milk in baked goods is set forth in U.S. Pat. No. 3,941,895. The prior art has not been able to put this invention into commercial practice since the cost of the whey protein concentrate far exceeds the cost of the non-fat dry milk constituent being placed. The only advantage that can be gained by using such a direct substitution would be in the preparation of baked goods having a high protein content.

One of the other areas of use of whey proteins has been in the area of whipping agents. Because of the similarity of the classes of proteins between egg albumen and whey proteins, a logical extension was to utilize whey proteins as a substitute for egg albumen or its functions. Numerous attempts have been made to interest various commercial organizations in utilizing whey protein concentrates as substitutes for egg albumen in baked goods as whipping agents and the like. However, the replacement of egg albumen with whey protein concentrates has not always been satisfactory. It is known that the use of a highly concentrated whey protein concentrate can be effectively used. Commercially, the processing steps needed to prepare the material would not make the substitution economical. Commercially available whey protein concentrate such as an ultrafiltered whey containing 50% protein will not effectively replace large amounts of egg albumen in cakes, even though an economic advantage could be gained by using the less expensive whey protein concentrate as a substitute for the albumen. The cakes so produced evidence lower cake volume, especially at a weight/weight replacement of albumen with concentrate and weaker texture particularly when albumen replacement is above 50%. Testing has shown that in general, only small amounts of egg albumen, i.e., up to 25%, can be replaced with the whey protein concentrate. Such use has not heretofore been considered to be generally commercially successful.

It has also been disclosed that a whey protein/carboxymethylcellulose (CMC) complex is useful as a substitute for eggs. This is described in the article "Studies on the Formulation of Egg Substitutes from Milk Protein Complexes for use in Caking Making", by R. S. Mann et al. (National Dairy Research Institute, Karnal India) *Journal of Food Science and Technology*, Volume 12, Nov. 5, September-October, 1975 (pp. 241–244). The complex used in the study was obtained according to the methods of Hidalgo and Hansen, Journal Agric. Fd. Chemistry, 1969, 5 p. 1087. Hidalgo et al. disclose forming a complex between beta-lactoglobulin and carboxymethylcellulose (CMC) by treating the protein with the CMC at an acid pH of about 4, an ionic strength of below about 0.1 and a ratio of CMC to protein of 0.25–0.50.

Hidalgo et al. teach that further addition of CMC caused resolubilization of the complex. They also teach that solutions of beta-lactoglobulin and CMC at pH 7 provided no complex. The complex formation is taught to occur through two separate reactions, a primary interaction which leads to the formation of insoluble complexes and a secondary reaction which solubilizes the complex.

It is also known that beta-lactoglobulin can be selectively complexed from whey by the method of Hidalgo et al. (See Selective Precipitation of Whey Proteins with Carboxymethylcellulose, Hidalgo and Hansen, *Journal of Dairy Science*, Volume 54, No. 9, September 1971, pp. 1270–1274). By treating whey with CMC at pH 4, a complex containing beta-lactoglobulin and bovine serum albumin can be separated. The alpha-lactalbumin can be complexed and removed from the supernatant by reaction with CMC at pH 3.2. The proteose-peptones remaining in the supernatant can be coprecipitated with calcium phosphate by raising the pH of the final supernatant to 7.5.

The use of CMC to form a CMC/beta-lactoglobulin complex which is useful as an egg substitute in cakes requires a specific reaction sequence which leaves the remaining whey proteins in solution. Further, only specific amounts of CMC can be effectively used to form the complexes. The amount of whey protein used as the egg substitute substantially dictates the amount of CMC which is present in the final product.

It has now been found that an egg albumen and egg substitute can be formed which overcomes the difficulties of using whey protein per se as well as the difficulties in forming a beta-lactoglobulin/CMC complex.

THE INVENTION

In accordance with the present invention, it has been found that the difficulties of replacing egg albumen with a whey protein concentrate can be overcome by replacing a portion of the albumen (dry solids basis) depending on the application up to 100% with a quantity of a substantially non heat-denatured whey protein concentrate containing at least 29% and preferably at least 35% protein prepared substantially from and preferably from at least 80% acid, e.g. cottage cheese, whey in such an amount that the total protein content provided by the whey protein concentrate (WPC) and albumen is no less than about 50% and preferably no less than about 38% below the protein content of the egg albumen (on a dry solids basis) originally present in the recipe and from about 0.5% to about 15% by weight carboxymethylcellulose based on the weight of the whey protein concentrate. If desired, the composition can include from about 25% to about 0% of another protein-containing whey based product.

The use of the carboxymethylcellulose in combination with the whey protein concentrate in baked goods such as cakes overcomes the deficiencies in cake texture and volume normally encountered in replacing egg albumen with whey protein concentrate. The composition of the present invention also effectively replaces egg albumen in other food areas such as puddings, sauces, soups, batters and the like.

The combination of the present invention can be used as such to replace egg albumen in a formulation or the combination can be combined with egg yolk and/or egg yolk replacers to form a whole egg replacer, with milk and/or milk replacers to replace egg albumen (or whole egg if yolk or yolk replacer is used) and milk solids non-fat, or as a whole egg extender. The composition of the present invention can also be used as a replacement for a portion of the albumen (dry solids basis) up to 75% and a portion of the milk solids non-fat up to 100% by using a sufficient quantity of the non heat-denatured whey protein concentrate containing at least 29% and preferably at least 35% protein prepared preferably from at least 80% cottage whey in such an amount that the total protein content of the combined whey protein concentrate, albumen and milk solids non-fat is no less than 10% below the protein content of the combined milk solids non-fat and egg albumen (on a dry solids basis) originally present in the recipe, the lactose content of the food product not exceeding 15% and preferably not exceeding 10% of the original lactose content of the milk solids non-fat replaced in combination with the carboxymethylcellulose. By this method, all the whey protein which is added is effectively utilized to thereby lower the cost of the two substitutions making the substitutions economical.

As used herein, all percentages are on a weight basis unless otherwise noted.

DETAILED DESCRIPTION OF THE PRESENT INVENTION

The acid cheese whey used in the present invention is derived from the acid coagulation of milk protein by the use of lactic acid producing bacteria (e.g., lactobacillus sp.) or by the addition of food grade acids such as lactic or hydrochloric acid, i.e., direct acidification. In either case, acidification is allowed to proceed until a pH of approximately 4.6 is reached. At this pH, casein becomes insolubilized and coagulates as cheese curd. The cheese commonly produced by this method is known as cottage cheese. The whey obtained in this manner is commonly called cottage cheese whey.

The whey protein concentrate as used in the present invention is preferably derived from 100% acid cheese whey though minor amounts of other cheese wheys of up to 20% can be utilized. Such other cheese wheys include but are not limited to cheddar cheese whey which is produced by the rennet coagulation or protein and is commonly called sweet whey. It is preferred that the whey source be at least 90% cottage cheese whey.

The whey protein concentrate used in the present invention can be prepared by any one of a number of known processes used for concentrating whey proteins including electrodialysis (Stribley, R. C., Food Processing, Volume 24, No. 1, page 49, 1963), reverse osmosis, (Marshall, P. G. et al., Fractionation and Concentration of Whey by Reverse Osmosis, Food Technology, 22(a), 696, 1968), gel filtration (U.S. Pat. No. Re. 27,806); or by ultrafiltration (Horton, B. S. et al., Food Technology, Volume 26, page 30, 1972). Chemical methods including the phosphate precipitation of whey protein can also be used as described in Gordon U.S. Pat. No. 2,388,624 and Melachouris U.S. Pat. No. 4,043,990. Delactosing can be used to increase protein content.

It has been found that the most effective results are obtained using an ultrafiltered whey concentrate from cottage cheese whey containing from about 40% to about 60% and preferably about 45% to about 55% and most preferably about 50% whey protein. In a typical process, cottage cheese whey is neutralized to a pH of about 6.4 with 50% caustic. After storage, the pH is then adjusted to about 7.2 and any solids or precipitates are removed by centrifugal clarifiers. The clarified liquor is then pasteurized. The liquor is then fed into an ultrafiltration membrane unit. The retentate is condensed and spray dried. Protein products of 29% or more whey protein can also be prepared by this process. Products generally comprising from about 40% to 80% protein (TN×6.38), 10–30% lactose, 3–15% ash and 0.1–4% fat are obtained. The dried retentate with the aforegiven composition is considered a whey protein concentrate. While it is preferred to use the whey protein concentrate in the dry form, the liquid form can also be used on a percent by weight protein basis. Liquid levels in the final formulation are then adjusted accordingly. For some applications, it has been found effective to use a liquid whey concentrate which has a solids content above 15% and preferably from about 18% to about 22%. Liquid whey protein concentrate must be kept under refrigeration to prevent spoilage.

The whey protein concentrate must be substantially non heat-denatured. By non heat-denatured is meant that at least 40% of the protein as determined by solubility at pH 4.6 has not been denatured by the heating which is utilized in the preparation such as in pasteurization and drying. Thus, freeze-drying would denature less protein than spray drying. The use of a food grade sulfite such as sodium sulfite, sodium bisulfite, cysteine, cystine and the like in an amount of from about 0.1% to about 0.5% by weight based on the whey protein concentrate is particularly advantageous in reducing the coagulation temperature of the whey protein from about 80° C. to about 70° C. This more nearly approximates the coagulation temperature of egg.

Carboxymethylcellulose or CMC is a water-soluble cellulose ether generally available as the sodium salt. CMC is known to have molecular weights which range from about 21,000 to 500,000. CMC is commercially available in viscosities ranging from above 10,000 cps in 1% solution to 25 cps in 2% solution and even lower viscosities. It is preferred that the CMC used in the present invention provides a viscosity within the range of from about 1,000 cps to about 10,000 cps in a 1% solution at 25° C.

The carboxymethylcellulose is used in an amount ranging from about 0.5 to about 15% and for use in baked goods preferably from about 0.5% to 5% and more preferable from about 1–3% based on the weight of the whey protein concentrate. In other areas higher levels as high as 15% based on the whey protein concentrate may be used. For instance in coating batters, for onion rings, amounts of from 9% to 14% have been found to be effective. Slight adjustments may be required depending on the area of use but these adjustments are well within the skill of the art.

The albumen replacer of the present invention can be used to replace up to 75% by weight of the albumen requirement in baking applications such as white, yellow, sponge and devil's food cakes, sweet doughs, biscuits, pancakes, doughnuts, muffins and the like. The replacement should be on a basis sufficient to provide at least 50% and preferably at least about 62% of the protein replaced (the combined protein content of the whey protein concentrate and albumen is no less than 38% below the protein content originally added to the recipe by the egg albumen). For example, using the preferred whey protein concentrate having a protein content of about 50%, the dry egg albumen solids can be replaced on a weight/weight basis with the composition of the invention. Higher and lower amounts of whey protein concentrate are used depending on the protein content. Thus, if a whey protein concentrate of less than 50% whey protein is used, the albumen would have to be replaced on a basis of greater than 1 to 1 to provide the requisite amount of protein. If the whey protein concentrate contains more than 50% whey protein, the replacement can be less than 1 to 1 if desired. It is not critical whether or not these specific bakery products are leavened by yeast or chemical leavening systems such as sodium acid pyrophosphate, sodium aluminum phosphate and the like in combination with a bicarbonate.

In other areas of egg albumen applications which are less sensitive to the effects of albumen than cakes, the egg albumen can be totally replaced with the compositions of the present invention. These applications in which the egg albumen can be totally replaced include but are not limited to puddings, sauces, soups, frozen batters including pancake batter, and coating batters for meat, fish and other food products such as onion rings.

The albumen replacer of the present invention can be used as is or combined with other ingredients to effect various end uses. A whole egg replacer can be prepared by blending the albumen replacer with egg yolk and/or an egg yolk replacer such as that described in U.S. patent application Ser. No. 677,354, now U.S. Pat. No. 4,072,764. In that patent application, the contents of which are hereby incorporated by reference, an egg yolk extender is provided which is the combination of full fat soy flour, lecithin, wheat flour and optionally emulsifiers, humectants, and coloring agents. In baking systems requiring egg yolk, up to 75% of the yolk can be effectively replaced. The equivalent percentage of egg albumen is also generally replaced with the egg albumen replacer of the present invention. Preferably, only about 50% of the yolk is replaced. For example, in a baking formulation requiring whole egg, 50% of the yolk requirement and 50% of the egg albumen can be replaced. An additional egg yolk replacer is disclosed in the copending application of Chess, Ser. No. 857,053, filed Dec. 5, 1977, wherein the previously discussed egg yolk replacer is prepared with defatted soy flour and oil in place of full fat soy flour. The contents of the latter application are hereby incorporated by reference.

It has been found that the egg albumen replacer composition of the invention can be used to extend whole eggs up to 50% replacement on a weight/weight basis calculated using a protein content of the whey protein concentrate of 50% as standard. It is not required to compensate for the yolk replaced.

It has been found that the combination of egg yolk or an egg yolk replacer and the egg albumen replacer of the present invention is effective in replacing whole eggs in batters used for coating poultry, fish, meat, or onion rings prior to cooking, i.e. baking or frying. The combination of the egg yolk replacer of U.S. Pat. No. 4,072,764 and the egg albumen replacer of the present invention is particularly effective in totally replacing whole egg in coating batter for onion rings. The viscosity of the batter can be varied to meet the needs of the user by modifying the level of CMC in the formulation. For this use, it is preferred that the CMC be used in an amount of from about 9% to about 14% by weight based on the weight of the whey protein concentrate The albumen replacer can be blended with milk replacers and if desired, yolk or yolk replacers to prepare albumen/NFDM or whole egg/NFDM replacers respectively. By milk replacers is meant any material formulated to replace milk. These include whey protein concentrate, whey products and soy/whey products. Of particular significance is the modified whey product prepared as a precipitate by either neutralizing acid whey or by adding calcium to sweet whey and neutralizing. This first method is disclosed in U.S. Pat. No. 4,036,999 and the second in Attebery U.S. Pat. No. 3,560,219, the disclosures of both which are hereby incorporated by reference. The milk replacer is preferably from about 20% to about 30% of the preceding modified whey product and from about 80% to about 70% whey protein concentrate. In this area of use, the albumen replacer of the invention contains the required amount of CMC based on the weight of the CMC and the whey protein concentrate used to replace the albumen. Any whey protein concentrate used as a milk replacer is not required to be included in the computation. For example, if 50 grams of egg albumen are to be replaced with the albumen replacer of the invention containing 4% CMC and 50 grams of the non-fat milk solids are to be replaced with whey protein concentrate, a product with 2% CMC can be used to replace both. The CMC remains at the 4% level when the percentage is based on the weight of the albumen replacer (the weight of the whey protein concentrated used in replacing the albumen). While the blend of whey protein concentrate/CMC could be used to replace milk solids, a cost savings could be achieved by replacing the milk with whey protein concentrate.

The albumen replacer can be used to replace a portion (up to 75%) of the egg albumen and up to all of the NFDM which may be required in a recipe. The only requirement in this use is the substantial balancing of the protein replaced with the protein added. Specifically, the whey protein concentrate/CMC can be used in the present invention to replace from about 25% to about 100% of the non-fat dry milk requirement and from about 25% to about 75% of the albumen requirement (dry solids basis) in baked goods. It is necessary that the protein replacement be used in an amount sufficient to provide at least 90% of the protein replaced. The amounts of albumen replaced are preferably dependent upon the amount of excess protein available after a 100% non-fat dry milk replacement with the whey protein concentrate/CMC blend. For this application, the whey protein concentrate must have at least 35% protein and preferably at least 45%. A particularly preferred product contains from about 45% to about 55% protein, e.g. about 50%. Liquid whey concentrate having at least 15% solids and preferably from about 18% to 22% solids has been found effective. Since non-fat dry milk contains about 35% protein and dried egg albumen contains about 80% protein, the amount of non-fat dry milk replaced with a product richer in protein must substantially compensate for the protein lost in replacement of the albumen. For instance, in a product containing 36 grams of albumen solids and 100 grams of non-fat dry milk, replacement of the 35% protein in non-fat dry milk with a whey concentrate of 50% protein would provide an extra 15 grams of protein. Since dried albumen contains about 80% protein, the 15 grams of protein could replace 18.75 grams of dried egg albumen of the 36 grams originally present. Any additional water lost in the replacement of liquid egg albumen would be compensated by adding a substantially equivalent amount of water.

In addition to compensating for the protein removed, it is also desirable in this use to avoid increasing the lactose content over 15% and preferably over 10% of that originally present in the formulation. It has been found that the lactose level also has an effect on the final characteristics of the food product. The whey protein concentrate, which contains large amounts of lactose, must be used in an amount not to significantly increase the lactose content of the formulation. This can be easily calculated by one skilled in the art in that non-fat dry milk generally contains about 51% lactose. It is more preferred that the lactose content be maintained at a point not more than 5% of the original lactose content.

While the illustration has been directed to non-fat dry milk, the invention broadly increases all sources of milk solids including whole milk (liquid or solids), skim milk, condensed or evaporated milk, and the like. Replacement is on the basis of protein content. In replacing liquid systems with a dry whey protein concentrate, sufficient water must be added to compensate for the loss. In replacing a milk product containing butterfat with the whey protein concentrate, a compensating amount of fat or oil may be added.

The present invention can be used in any baking application where albumen (egg white) or whole egg and optionally, egg yolk and non-fat dry milk are present. These include bakery products such as those previously discussed as well as puddings, sauces, soups, batters including frozen batters for pancakes and the like as well as batters for coating food prior to frying or baking (chicken, fish, onion rings, and the like).

The replacement can occur at the time of preparing the bakery product or in preparing mixes, either frozen or dried, for preparing the bakery product. Liquid mixes should be refrigerated as they are subject to spoilage. The replacement of egg albumen is intended to relate to the areas of use of albumen in structure forming in baked goods and not as a whippable system capable of forming freestanding foams in the manner of egg albumen. Bakery goods are not intended to include meringues and angel food cakes.

In some applications, a small amount of from about 25% to 0% of dried whey or other protein-containing whey based products such as delactosed whey, dried whey, modified whey solids and the like can be added to reduce the overall cost. The amount added must be such as to maintain the formulation within the protein limits and because of this, the addition of whey is less preferred.

In a formulation originally contains a small amount of whey solids, the whey protein concentrate/CMC blend could be used as a substitute for that material also. This is generally only practical if the simplification of the replacement justifies the cost differential.

As used herein, the protein amount is based on total Kjeldahl nitrogen (TN×6.38).

The invention is further illustrated in the examples which follow.

EXAMPLES 1-5

Sponge cake was prepared using the egg albumen and egg albumen/non-fat dry milk substitutes of the invention according to the following formulation and mixing procedure:

| SPONGE CAKE FORMULATION | |
| --- | --- |
| Ingredients: | |
| Cake Flour | 300gm |
| Sugar | 360gm |
| Non-fat dry Milk, (Superheat) or Whey Protein Concentrate/CMC Blend | 22.5gm |
| Salt | 9.4gm |
| Baking powder | 8.5gm |
| Atmos G-2462 Emulsifier* | 15.0gm |
| Dried Egg Yolk | 37gm |
| Egg Albumen or Whey Protein Concentrate/CMC Blend | 16gm |
| Water - 1st stage | 210cc |
| 2nd stage | 150cc |
| Vanilla | 2cc |

Atmos G-2462 - a combination of hydrated mono and diglycerides, polysorbate 60 and sorbitan monostearate

TABLE I

| Example | Albumen qms | % Rep. | NFDM qms | % Rep. | Whey Pro. Concen. qms | CMC % of WPC |
| --- | --- | --- | --- | --- | --- | --- |
| 1 Control | 21 | 0 | 30 | 0 | 0 | 0 |
| 2 Control | 10.5 | 50% | 30 | 0 | 10.5 | 0 |
| 3 | 10.5 | 50% | 30 | 0 | 10.5 | 5% |
| 4 Control | 10.5 | 50% | 8.1 | 73% | 32.4 | 0 |
| 5 | 10.5 | 50% | 8.1 | 73% | 32.4 | 1.63% |

MIXING PROCEDURE

1. Use Hobart Model C-100 with 2.85 liter (3 quart) bowl and wire whip.
2. Place all dry ingredients in bowl with emulsifier.
3. All 210 cc ice water plus 2 cc vanilla and mix. Scrape after each interval.

| Minutes | Speed |
| --- | --- |
| ½ | low |
| 1 | medium |
| 3 | high |
| 3 | high |

4. Add 150 cc water and mix. Scrape after each interval.

| Minutes | Speed |
| --- | --- |
| ½ | low |
| 2 | medium |
| 4 | low |
| 2 | medium |

5. If specific gravity of 0.510-0.525 has not been obtained, mixed an additional 30 seconds at high speed.
6. Scale 283 gms into a 16.51 centimeter (6.5 inch) ungreased tube pan. Bake at approximately 190° C. for 30 minutes.

Controls were prepared using egg albumen. The test cakes were judged similar to the control of Example 1 in flavor, strength, structure, color and overall appearance.

The results are reported in Table II below.

TABLE II

Effect Of CMC On Functionality Of Albumen Or Albumen And Non-Fat Dry Milk Replacers In Sponge Cake

| Example | Batter Spec. Grav. | Cake Spec. Vol. | Grain** |
|---|---|---|---|
| 1. Albumen Control | 0.485 | 4.82 | 1 |
| Albumen replacer | | | |
| 2. 50% replacement of albumen with WPC* | 0.565 | 4.40 | 1 |
| 3. 50% replacement of albumen with WPC* containing 5% CMC | 0.505 | 4.80 | 1 |
| Albumen and non-fat dry milk replacer | | | |
| 4. Replacement of 50% albumen and 73% non-fat dry milk with WPC* | 0.590 | 4.38 | 1 |
| 5. Replacement of 50% albumen and 73% non-fat dry milk with WPC* containing 1.63% CMC | 0.520 | 4.75 | 1 |

*Whey protein concentrate containing approximately 50% protein from cottage whey
**1 to 3 (1 = best, 3 = least desirable)

EXAMPLES 6 and 7

A whole egg replacer was prepared in accordance with the present invention by blending together the ingredients listed in Table III below.

The yolk replacer was prepared in accordance with U.S. Application Ser. No. 677,354.

The whey protein concentrate was an ultrafiltered cottage cheese whey having at least 50% protein sold as ENRPRO 50, by Stauffer Chemical Company, Westport, Connecticut.

The partially soluble modified whey solids comprise the precipitate obtained by neutralizing acid whey in accordance with U.S. Pat. No. 4,036,999.

TABLE III

| Example | Yolk Replacer | Whey Prot. C. | Mod. Whey Solids | CMC |
|---|---|---|---|---|
| 6 | 42% | 57% | — | 1% |
| 7 | 30% | 52% | 17% | 1% |

EXAMPLES 8-12

A high sugar/flour ratio (119%) yellow cake was prepared with the whole egg replacers of the invention using the following formulation and procedure:

| RETAIL YELLOW CAKE MIX High Sugar/Flour ratio 119% | |
|---|---|
| YELLOW CAKE FORMULATION: | GRAMS |
| Cake flour, Snosheen | 248.11 |
| Sugar, Baker's Special | 294.61 |
| Shortening GLP Type | 66.29 |
| Durkee D-21 Emulsifier, I.C.I. America Inc. Atmos G-2462 | 5.70 |
| Non-fat Dry Milk, Super Heat | 19.19 |
| Salt | 6.88 |
| BL-60, Sodium Aluminum Phosphate leavening Agent | 5.90 |
| Soda | 4.91 |
| Wheat Starch, Gelatinized | 2.75 |
| CMC, 7HF (high viscosity, food grade) | 0.66 |
| | 655.00 |
| Liquid whole egg or liquid replacer (see Table IV) | 100 cc |

PROCEDURE

1. Sift all dry ingredients. Mix in Hobart bowl speed No. 1 for 5 minutes.
2. For two cakes—mix 583 grams of the dry mix, 66.3 gms shortening and the 5.7 grams emulsifier. Mix at speed No. 1 for 3 minutes.
3. Into a Hobart C-100 mixer with small bowl and paddle, scale 655 grams. Add 100 cc. whole fresh eggs (which have been preblended) or 100 cc. of the replacer as defined in Table V and 130 cc. water. Blend in at speed No. 1 for 30 seconds. Scrape. Change to speed No. 3 and mix for 4 minutes. Scrape.
4. Add 140 cc. water. Blend in at speed No. 1 for 30 seconds. Scrape. Mix 4 minutes at speed No. 1. Scrape.
5. Scale 390 grams of batter into each of two 20.3 centimeter (8 inch) pans.
6. Bake at 190° C. (375° F.) for approximately 25 minutes. Test to be sure cake is baked.
7. Cool on the rack for 30 minutes. Depan and cool an additional 15 minutes before evaluating.

TABLE IV

| Example No. | Liquid Whole Egg (grams) | Liquid Albumen (grams) | WPC (grams) | H2O (ml) | Egg Yolk Replacer (solids) *Egg Yolk (liquid) (grams) | CMC (grams) |
|---|---|---|---|---|---|---|
| 8 Control Yolk | 500 | — | — | — | — | — |
| 9 Replacer Whole Egg | 225 | 175 | — | 50 | 50 | — |
| 10 Replacer* Whole Egg | 225 | — | 19.95 | 204 | 50 | 1.05 |
| 11 Replacer** Albumen | 225 | — | 32.30 | 191 | 50 | 1.70 |
| 12 Replacer | 225 | — | 19.95 | 154 | *100 | 1.05 |

*weight/weight replacement of albumen.
**protein/protein replacement of albumen.

The batter and cakes baked therefrom were evaluated with the following results.

TABLE VI

| Example No. | NFDM Replaced | Batter Specific Gravity | Cake Specific Volume | Hardness* (grams) | Grain** |
|---|---|---|---|---|---|
| 8 | — | .765 | 3.48 | 503 | 1 |
| 9 | — | .755 | 3.50 | 516 | 1 |
| 10 | — | .745 | 3.29 | 476 | 1 |
| 11 | — | .775 | 3.25 | 493 | 1 |
| 12 | — | .770 | 3.56 | 483 | 1 |
| 10 | I | .760 | 3.42 | 510 | 1 |
| 10 | II | .760 | 3.38 | 503 | 1 |

Ex. 10 - I.
9.6 grams WPC used to replace 9.6 grams (50%) in formulation.
Ex. 10 - II.
5.86 grams of the precipitate formed by neutralizing acid whey and 13.6 grams of WPC used to replace 19.19 grams (100%) NFDM in formulation.
*The hardness was measured using an Instron Compression tester model 130. Cakes were cut in half and then cut into slices of 30 mm in height according to the following diagram:

the cake slices numbered 1, 2 and 3 were compressed using a small compression anvil (3.5cm diameter) using a 2000 gram load cell. Hardness was determined by the force in grams required to compress the cake to a point as measured from 13 centimeters (each piece was compressed twice).
**Score 1 to 3 (1 = best, 3 = least desirable).

EXAMPLES 13-15

A low sugar/flour ratio (108%) yellow layer cake was prepared with the whole egg replacers of the invention using the following formulation and procedure:

| YELLOW LAYER CAKE (FLOUR/SUGAR RATIO 108%) | |
|---|---|
| Ingredients: | Grams |
| Sugar, B.S. Granulated | 336 |
| Invert Sugar Nulomoline | 36 |
| Cake flour, Snosheen | 342 |
| Whole egg solids or whole egg replacer (see Table VII) | 27 |
| NFDM, Super heat | 24 |
| Baking Powder | 15 |
| Salt | 7.5 |
| Shortening - Emulsified | 60 |
| Emulsifier G-2462 | 6 |
| Water 1st stage | 168 |
| Water 2nd stage | 60 |
| Water 3rd stage | 120 |
| Vanilla | 6 cc |

PROCEDURE

1. Sift dry ingredients into a 2.85 liter (3 quart) bowl of a Hobart C-100 mixer equipped with a paddle.
2. Scale sugar into separate bowl and add invert sugar to a nest made in the sugar. Blend sugar with dry ingredients. Blend in shortening, then emulsifier.
3. Blend in 1st stage water (50-55% ice, 50-45% tap water) at speed No. 1 for ½ minute and scrape, speed No. 2 for two minutes and scrape and speed No. 3 for two minutes.
4. Blend in 2nd stage water (100% tap water or 50% ice/50% tap water) and vanilla at speed No. 1 for ½ minute, speed No. 2 for 1 minute and scrape and speed No. 2 for 1 minute.
5. Blend in 3rd stage water (100% tap water) at speed No. 1 for ½ minute and scraping, followed by speed No. 1 for 1 minute. Scale 390 grams into each of two 20.3 centimeter (8 inch) pans and bake for 30 minutes at 182° C. (360° F.).

TABLE VII

A Comparison Of Functionality Between The Whole Egg Replacer Of The Invention And A Commercial Whole Egg Replacer In Low Ratio Yellow Layer Cake (108%)

| Example | Batter Spec. Grav. | Specific Volume (1 hr) | Specific Volume (72 hrs.) | Grain | Hardness*** (grams) |
|---|---|---|---|---|---|
| 13-Whole Egg Control | .865 | 3.10 | 2.99 | 2 | 840 |
| 14-Whole Egg Replacer** | .870 | 3.25 | 3.21 | 1 | 880 |
| 15-Commercial Whole Egg Replacer | .865 | 3.23 | 3.12 | 3 | — |

*Score 1-3 (1 = best, 3 = least desirable)
**30% whole egg, 17.5% egg white, 51.5% whey protein concentrate and 1% CMC.
***Instron measurement (See Examples 17-21).

EXAMPLES 16-20

The functionality of the whole egg replacer of the invention was compared against other commercial egg replacer products and whole egg controls in sponge cakes (see Sponge Cake, Example 1 and high ratio yellow layer cakes, Example 17 for formulation and procedure) with the following results:

TABLE VIII

SPONGE CAKE

| Example | % Whole Egg Replaced | Batter Specific Gravity | pH | Cake Specific volume$^d$ | Texture (grain)$^e$ |
|---|---|---|---|---|---|
| 16-Control (whole egg) | — | 0.510 | 7.08 | 4.53 | 1 |
| 17-Whole Egg Replacer, Ex. 23 | 100 | 0.500$^b$ | 6.95 | 4.46 | 1 fine grain |
| 18-Commercial Whole Egg. Rep.A | 100 | 0.460$^b$ | 7.16 | 4.37 | 1 |
| 19-Commercial Yolk Replacer | 50$^a$ | 0.525 | 6.88 | 4.29 | 2.5 coarse grain |
| 20-Commercial Whole Egg Rep. B | 50$^a$ | 0.520 | 7.14 | 4.25 | 1.0$^c$ | a = 50% yolk replaced
b = the batter is thicker than normal
c = slightly off taste
d = significant difference is .10 variance from the control
e = score 1-3 (1 = best; 3 = least desirable).

Similar results were obtained in low ratio yellow layer cakes.

EXAMPLES 21-28

The effect of gums and particularly CMC in albumen replacers and albumen/non-fat dry milk replacers was determined against zero level controls and albumen controls in institutional yellow layer cake (sugar/flour ratio 119%) prepared using the following formulation procedure:

| FORMULATION: | GRAMS |
|---|---|
| Cake Flour, Snosheen | 236.30 |
| Sugar, Baker's Special | 280.60 |
| Shortening, GLP Type Durkee D-21 | 63.10 |
| Emulsifier, I.C.I. America Inc. G-2462 | 5.00 |
| NFDM, Super Heat | 18.30 |
| Dry Egg Yolk | 22.80 |
| Dry Egg Albumen | 9.10 |
| Salt | 6.50 |
| BL-60, leavening agent | 5.60 |
| Soda | 4.70 |
| Wheat Starch, Gelatinized | 2.60 |
| CMC 7HF (High viscosity, Food grade) | 0.59 |
|  | 655.19 |

PROCEDURE

1. Sift all dry ingredients. Mix in Hobart bowl speed No. 1 for five minutes.
2. For two cakes—to 587 grams of mix add 63.1 grams shortening plus 5.0 grams emulsifier. Mix speed No. 1 for three minutes.

BAKING: HOBART C-100 MIXER, SMALL BOWL AND PADDLE

1. Into a Hobart C-100 mixer with small bowl and paddle, scale 655 grams of mixture from Step 2. Add 180 cc water. Blend in at speed No. 1 for 30 seconds. Scrape. Change to speed No. 3 and mix for four minutes. Scrape.
2. Add 170 cc water. Blend in at speed No. 1 for 30 seconds. Scrape. Then mix four minutes at speed No. 1. Scrape.
3. Scale 410 grams of batter into each of two 20.3 centimeters (8 inch) pans.
4. Bake at 190° C. (375° F.) for approximately 27 minutes. Test cake to be sure it is baked completely.
5. Cool on the rack for 30 minutes. Depan and cool an additional 15 minutes before evaluating.

The results are reported in the following table:

TABLE IX

Effect Of Gums On Functionality Of A WPC* Albumen Replacer (50% Replacer) In Yellow Layer Cake

| Gum** %(w/w/ of WPC) | Batter (Sp. Gr.) | Cake (Sp. Vol.) | Break (mm) |
|---|---|---|---|
| CMC |  |  |  |
| Ex. 21 - 0% | 0.790 | 3.17 | 67 |
| Ex. 22 - 1% | 0.795 | 3.16 | 62 |
| Ex. 23 - 2.5% | 0.785 | 3.25 | 62 |
| Ex. 24 - 5.0% | 0.805 | 3.20 | 66 |
| Carrageenan |  |  |  |
| Ex. 25 - 0% | 0.790 | 3.17 | 67 |
| Ex. 26 - 1% | 0.805 | 3.14 | 55 |
| Ex. 27 - 2.5% | 0.800 | 3.13 | 68 |
| Ex. 28 - Albumen Cont. | 0.780 | 3.28 | 65 |

24 hours after baking, a slice of cake measuring 192×13 mm is cut and slid over the edge of a counter. The point at which the slice breaks is recorded (number of millimeters of the broken off piece). This test is an indication of the fragility of the cake. This data is reported above as "Break".

As can be seen from these data, the use of the albumen replacer with the CMC more nearly matches the results obtained with albumen. Most effective results are shown at about 2.5% CMC. Carrageenan did not show any more beneficial effects than CMC at 1.0 to 2.5% levels.

White cakes prepared replacing 50% of the egg albumen with whey protein concentrate and up to 5% CMC were equivalent to white cakes prepared by replacing 50% of the egg albumen with whey protein concentrate. The use of carrageenan in place of CMC at a 1% to 2.5% level showed no significant difference over CMC but was unacceptable at the 5% level as the cake dipped in the center.

EXAMPLES 29-33

A liquid batter for onion rings was prepared by blending 0.24 liters (1 cup) of flour, 1.25 milliliters (¼ teaspoon) salt, 0.16 liters liquid whole milk, 15 milliliters oil, and 50 milliliters liquid whole egg or 14 grams whole egg replacer with 36 milliliters water.

The whole egg replacer was a blend of an egg yolk replacer, whey protein concentrate, and CMC. The specific proportion being shown in Table X. The egg yolk replacer was prepared in accordance with Example 1 of U.S. Pat. No. 4,072,764 by placing 146.29 kg (68.6%) full fat soy flour and 45.36 kg (21.3%) short patent wheat flour into a ribbon blender. To the flour blend was slowly added while mixing 9.07 kg (4.3%) lecithin which had been preheated to about 40° C. After the lecithin was thoroughly mixed with the flour, 6.8 kg (3.2%) glycerin (U.S.P.) was added with mixing. To this blend was added with mixing 4.54 kg (2.1%) polysorbate 60 which is a polyoxyethylene sorbitan monostearate sold under the tradename Tween 60. After the emulsifier had been thoroughly blended, there was added with mixing 1.13 kg (0.53%) carrageenan (CARASTAY ® 26 from Stauffer Chemical Company, Westport, Connecticut). The product was then milled in a "Fitzmill TM " hammer mill.

Table X which shows the composition of the whole egg replacer also shows the viscosities provided by the batter mixes. The composition of Example 30 proved to be most effective for coating onion rings because of the viscosity of the batter. All examples fried effectively and provided good tasting coatings.

TABLE X

| EXAMPLE | 29 | 30 | 31 | 32 | 33 |
|---|---|---|---|---|---|
| Egg Yolk Replacer* | 62 | 60.5 | 60 | 100 | — |
| Whey Protein Concentrate* | 36.5 | 35.5 | 35.0 | — | — |
| CMC (7HF) % Albumen Repacer** | 4.11 | 11.3 | 14.3 | — | — |
| % Whole Egg Replacer* | 1.5 | 4 | 5 | — | — |
| Liquid Whole Egg | — | — | — | — | 50 grams |
| Viscosity of Batter (Centipoise, at 21° C.) | 2,080 | 3,840 | 4,400 | 2,240 | 3,440 |

*Percentage relates to the percentage of the ingredient in the whole egg replacer.
**Based on the weight of the whey protein concentrate.

What is claimed is:

1. A method for preparing egg albumen containing food products which comprises replacing at least a portion of the albumen requirement of said food product on a dry solids basis with a composition comprising a substantially non-heat denatured whey protein concentrate having at least 29% protein prepared substantially from acid cheese whey and from about 25% to 0% of another protein-containing whey-based product and 0.5% to 15% carboxymethylcellulose in such an amount that the total protein content provided by the whey protein concentrate and the egg albumen is no less than 38% below the protein content of the egg albumen on a dry basis originally present in the recipe.

2. The method as recited in claim 1 wherein said food product is a bakery product and the amount of egg albumen replaced is up to about 75% of said albumen requirement.

3. The method as recited in claim 1 wherein from about 40% to about 60% of said albumen is replaced.

4. The method as recited in claim 1 wherein the protein content of said whey protein concentrate is between about 45% and about 55% by weight.

5. The method as recited in claim 1 which further includes the addition of a food grade sulfite in an amount of from about 0.1% to about 0.5% based on the weight of the whey protein concentrate.

6. The method as recited in claim 1 wherein said whey protein concentrate has at least 35% protein.

7. An egg albumen replacer comprising a substantially non heat-denatured whey protein concentrate having at least 29% protein prepared substantially from acid cheese whey and from about 25% to 0% of another protein containing whey and from about 9% to about 15% carboxymethylcellulose.

8. The egg albumen replacer as recited in claim 7 wherein the protein content of said whey protein concentrate is between about 45% and about 55% by weight.

9. The egg albumen replacer as recited in claim 7 which further includes the addition of a food grade sulfite in an amount of from about 0.1% to about 0.5% based on the weight of the whey protein concentrate.

10. The egg albumen replacer as recited in claim 7 wherein said whey protein concentrate has at least 35% protein.

11. In a method for preparing a food product containing egg albumen and milk solids, the improvement which comprises replacing at least a portion of the albumen requirement of said food product on a dry solids basis up to about 75% by weight with the product of the method of claim 1 and at least a portion of the milk solids non-fat requirement of said food product up to 100% by weight with a composition comprising from about 75% to 100% by weight substantially non-heat denatured whey protein concentrate having at least 35% protein prepared substantially from acid cheese whey and from about 25% to 0% of another protein containing whey-based product, the protein of said albumen and said milk solids non-fat being replaced with protein in an amount equivalent to a minimum of 90% by weight of the weight of protein replaced and a maximum such that the protein replaced is substantially balanced with the protein added, the lactose content of the food product not exceeding 10% of the original lactose content of the milk solids non-fat replaced.

12. The method as recited in claim 11 wherein from about 40% to about 60% of said albumen and from about 50% to 100% of said milk solids non-fat is replaced.

13. The method as recited in claim 11 wherein the protein content of said whey protein concentrate is between about 45% and about 55% by weight.

14. The method as recited in claim 11 which further includes the addition of a food grade sulfite in an amount of from about 0.1% to about 0.5% based on the whey protein concentrate.

15. A method for preparing a whole egg containing food product which comprises replacing up to about 50% of the whole egg requirement of said food product on a dry basis with the composition prepared in accordance with the method of claim 1.

16. The method as recited in claim 15 wherein the protein content of said whey protein concentrate is between about 45% and about 55% by weight.

17. A food product prepared by the method of claim 15.

18. A whole egg replacer comprising an egg yolk material selected from the group consisting of egg yolk, egg yolk substitute and mixtures thereof in combination with the albumen replacer as recited in claim 8 in a solids ratio of from about 75/25 to about 65/35.

19. The whole egg replacer as recited in claim 18 which further includes a member selected from the group consisting of milk solids non-fat, substitutes therefor and mixtures thereof.

20. A batter for fried foods normally including egg solids wherein the egg solids requirement of said batter is replaced in an amount of up to 100% by weight with the product of claim 18.

* * * * *

UNITED STATES PATENT AND TRADEMARK OFFICE
CERTIFICATE OF CORRECTION

PATENT NO. : 4,214,009
DATED : July 22, 1980
INVENTOR(S) : Pei K. Chang

It is certified that error appears in the above—identified patent and that said Letters Patent is hereby corrected as shown below:

Column 1, line 64, please delete "Caking" and insert -- Cake --;

Column 4, line 9, please delete "ultratiltration" and insert -- ultrafiltration --;

Column 4, line 52, please delete "preferable" and insert -- preferably --;

Column 6, line 2, please insert a period (.) after "concentrate";

Column 6, line 31, please delete "concentrated" and insert -- concentrate --;

Column 7, line 19, please delete "increases" and insert -- included --;

Column 7, line 54, please delete "In" and insert -- If --;

Column 8, at footnote of "Sponge Cake Formulation", please insert an asterisk (*);

UNITED STATES PATENT AND TRADEMARK OFFICE
CERTIFICATE OF CORRECTION

PATENT NO. : 4,214,009
DATED : July 22, 1980
INVENTOR(S) : Pei K. Chang

It is certified that error appears in the above—identified patent and that said Letters Patent is hereby corrected as shown below:

Column 8, line 37, please delete "All" and insert -- Add --;

Column 10, Table IV, please delete entire table and insert:

--
TABLE IV

| Example No. | Liquid Whole Egg (grams) | Liquid Albumen (grams) | WPC (grams) | $H_2O$ (ml) | Egg Yolk Replacer (solids) *Egg Yolk (liquid) (grams) | CMC (grams) |
|---|---|---|---|---|---|---|
| 8 Control | 500 | --- | --- | --- | | --- |
| 9 Yolk Replacer | 225 | 175 | --- | 50 | 50 | --- |
| 10 Whole Egg Replacer* | 225 | --- | 19.95 | 204 | 50 | 1.05 |
| 11 Whole Egg Replacer** | 225 | --- | 32.30 | 191 | 50 | 1.70 |
| 12 Albumen Replacer | 225 | --- | 19.95 | 154 | *100 | 1.05 |

\* weight/weight replacement of albumen.
\*\* protein/protein replacement of albumen.

UNITED STATES PATENT AND TRADEMARK OFFICE
CERTIFICATE OF CORRECTION

PATENT NO. : 4,214,009
DATED : July 22, 1980
INVENTOR(S) : Pei K. Chang

It is certified that error appears in the above—identified patent and that said Letters Patent is hereby corrected as shown below:

Column 11, Table VI, under * footnote, line 14, please delete "130" and insert -- 1130 --;

Column 12, Table VII, in heading after "Grain", please insert an asterisk (*);

Column 13, Table IX, please insert as footnote -- * Whey Protein Concentrate having about 50% protein prepared by the ultrafiltration of cottage cheese whey --;

Column 14, line 27, after "CMC", please delete the period (.), insert a comma (,) and make "The", -- the --.

Signed and Sealed this

Eleventh Day of November 1980

[SEAL]

Attest:

SIDNEY A. DIAMOND

Attesting Officer

Commissioner of Patents and Trademarks

UNITED STATES PATENT AND TRADEMARK OFFICE
CERTIFICATE OF CORRECTION

PATENT NO. : 4,214,009
DATED : July 22, 1980
INVENTOR(S) : Pei K. Chang

It is certified that error appears in the above-identified patent and that said Letters Patent are hereby corrected as shown below:

On the title page, Insert:

Related U.S. Application Data

[63] Continuation-in-Part of Serial No. 868,598, filed January 11, 1978. (now abandoned)

Column 1 - Cross References to Related Applications

The present application is a continuation-in-part of Ser. No. 868,598, filed January 11, 1978. (now abandoned)

Signed and Sealed this

Nineteenth Day of January 1982

[SEAL]

Attest:

Attesting Officer

GERALD J. MOSSINGHOFF

*Commissioner of Patents and Trademarks*